United States Patent
Pauley et al.

(10) Patent No.: US 8,996,690 B1
(45) Date of Patent: Mar. 31, 2015

(54) TIME-BASED ANALYSIS OF DATA STREAMS

(75) Inventors: Wayne Pauley, Nashua, NH (US); Mich Fisher, Natick, MA (US); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 84 days.

(21) Appl. No.: 13/340,104

(22) Filed: Dec. 29, 2011

(51) Int. Cl.
  *G06F 15/173* (2006.01)
  *H04L 29/06* (2006.01)
  *G06F 11/34* (2006.01)

(52) U.S. Cl.
  CPC ............. *H04L 29/06* (2013.01); *G06F 11/34* (2013.01)
  USPC .......................................... 709/224; 340/506

(58) Field of Classification Search
  None
  See application file for complete search history.

(56) References Cited

U.S. PATENT DOCUMENTS

| | | | |
|---|---|---|---|
| 6,993,246 B1* | 1/2006 | Pan et al. ...................... | 386/201 |
| 2003/0067943 A1* | 4/2003 | Arsenault et al. ............. | 370/468 |
| 2005/0114036 A1* | 5/2005 | Fruhling et al. ................ | 702/19 |
| 2007/0180490 A1* | 8/2007 | Renzi et al. ....................... | 726/1 |
| 2008/0059474 A1* | 3/2008 | Lim .................................. | 707/9 |
| 2008/0126158 A1* | 5/2008 | Notea .............................. | 705/7 |
| 2009/0254970 A1* | 10/2009 | Agarwal et al. ................ | 726/1 |
| 2010/0321183 A1* | 12/2010 | Donovan et al. .............. | 340/540 |

OTHER PUBLICATIONS

P. Mell et al., "The NIST Definition of Cloud Computing," National Institute of Standards and Technology (NIST), Special Publication 800-145, Sep. 2011, 7 pages.
U.S. Appl. No. 13/247,423, filed Sep. 28, 2011 and entitled "Method and Apparatus for Friendly Man-in-the-Middle Data Stream Inspection."

* cited by examiner

*Primary Examiner* — Lisa Lewis
*Assistant Examiner* — Maung Lwin
(74) *Attorney, Agent, or Firm* — Ryan, Mason & Lewis, LLP

(57) ABSTRACT

Techniques are disclosed for performing a time-based analysis on data streams in a computing network. For example, a method includes the following steps. Two or more data streams are accessed. The two or more data streams can be associated with two or more source devices, two or more application programs, or combinations thereof. A time-based analysis is performed on the two or more data streams. The time-based analysis determines whether or not a correlation exists between portions of the two or more data streams.

20 Claims, 11 Drawing Sheets

TIME-BASED ANALYSIS OF DATA STREAMS

FIELD

The field relates to data management in computing networks, and more particularly to techniques for performing an analysis on data streams in such computing networks.

BACKGROUND

The proper management of data in the electronic world in which we live and do business is critical for many reasons.

For example, privacy is a major concern when it comes to an individual's or a company's data. Privacy is the claim of individuals, groups or institutions to determine for themselves when, how, and to what extent information about them or in their possession is communicated to others. Private information is frequently made public or semi-public via emails, blogs and postings to social networking services, often without foresight as to the consequences of such a divulgence. Additionally, intentionally divulged information that is intended to be maintained as private is routinely sold to advertisers and information brokers. Moreover, with the proliferation of application program ("app") usage in mobile devices such as smartphones, additional information is available on the "information market," including users' location, age, gender, income, ethnicity, sexual orientation and political views.

By way of another example, data that is generated on a mobile device, or otherwise stored thereon, and transmitted from the mobile device is susceptible to public divulgation. In the case of proprietary technical information, such divulgation may have intellectual property ramifications, e.g., loss of important trade secrets and/or valuable patent rights.

Thus, the ability to manage personal and/or business data is critical.

SUMMARY

Embodiments of the present invention provide techniques for performing a time-based analysis on data streams in a computing network.

In one embodiment, a method comprises the following steps. Two or more data streams are accessed. The two or more data streams can be associated with two or more source devices, two or more application programs, or combinations thereof. A time-based analysis is performed on the two or more data streams. The time-based analysis determines whether or not a correlation exists between portions of the two or more data streams.

A time-sequenced representation may be generated from the time-based analysis. The time-sequenced representation indicates correlated portions of the two or more data streams. One example of such a time-sequenced representation is a timeline. Further, the method may determine whether or not correlated portions of the two or more data streams are indicative of a violation of a policy.

In another embodiment, a computer program product is provided which comprises a processor-readable storage medium having encoded therein executable code of one or more software programs. The one or more software programs when executed by a processor of a processing device implement steps of the above-described method.

In yet another embodiment, an apparatus comprises a memory and a processor operatively coupled to the memory and configured to perform steps of the above-described method.

Advantageously, in accordance with one or more embodiments of the invention, data privacy violations can be discovered, as well as a frequency of past occurrence of such violations. Embodiments can also determine if a current data stream is correlated to past data streams. Further, embodiments can determine specific pattern correlations over given time periods. Still further, embodiments may be employed in a home or personal environment, as well as a business or commercial environment.

These and other features and advantages of the present invention will become more readily apparent from the accompanying drawings and the following detailed description.

DETAILED DESCRIPTION

Figure 1:
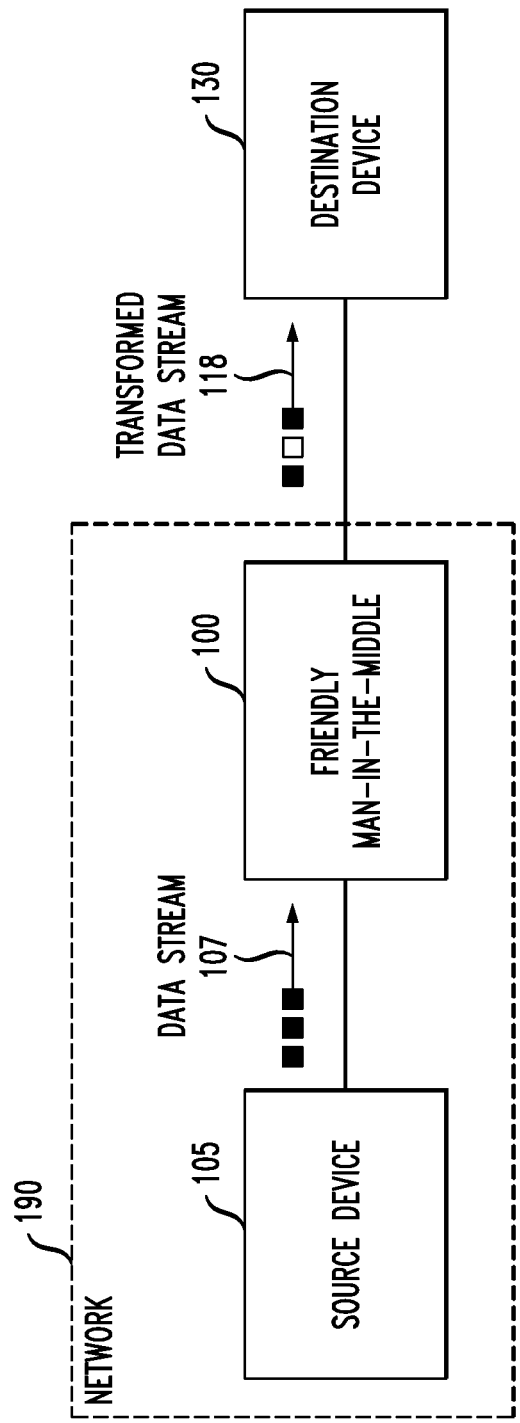
FIG. 1 shows a network environment with a friendly man-in-the-middle device in accordance with one embodiment of the invention.

Embodiments of the present invention will be described herein with reference to exemplary computing networks, information processing systems, computing systems, data storage systems and associated servers, computers, storage units and devices and other processing devices. It is to be appreciated, however, that embodiments of the invention are not restricted to use with the particular illustrative network, system and device configurations shown. Moreover, the phrases "computing network," "information processing system," "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the phrase "data stream" or "content stream" refers to any given set of data items, data units or data objects that may be part of a computing network. A data stream or content stream may take on any form and it is to be understood that the invention is not limited to any particular form. For example, a data stream or content stream may be electronic data relating to one or more messages such as SMS (Short Messaging Service) messages and/or MMS (Multimedia Messaging Service) messages, audio and/or video chats, web pages, documents, records, files, images, videos, electronic mail (email), or any other type of data set, data items, data units, or data objects. Thus, embodiments of the invention are not limited to any particular type of data or content.

It is realized that as the number of Internet-connected devices in a home and/or an enterprise (e.g., business or commercial entity) continues to rise, the concept of privacy is increasingly caught in the midst of two divergent forces: (1) an individual's, group's or institution's likely desire to maintain information as private; and (2) the increasing vulnerability of such information to a privacy breach or unintended disclosure. Internet-connected devices in a household/enterprise may include, but are not limited to, personal computers, laptop computers, televisions, audiovisual (A/V) receivers, music players, radios, appliances and game systems, smartphones and tablet computers. While many of these devices have a method to block Internet access entirely, they lack finer-grain controls for limiting Internet access.

For example, existing methods for controlling the disclosure of private information include centralized devices that entirely block access to a particular resource by using source/destination routing filters, regardless of content that is being sent to or received from that resource. Further, while there are some endpoint-based protections that examine content, they are one-off per client, require an administrator to set up and manage each device manually, and do not protect all device types (i.e., are only available on certain platforms). Moreover, while many of these devices provide logging capabilities, the rapidly increasing number of such devices and the amount of information they log removes from the realm of possibility an administrator's ability to police those logs to determine, albeit after the fact, private information that was disclosed.

Therefore, a centralized point of control is desirable that performs an analysis of context and content of a data stream, such as, but not limited to, privacy-related portions of a data stream. Within the household, for example, a broadband router is generally a common access point for most home-based Internet-connected devices. Thus, by implementing an intelligent layer, for example, in the router (or as a standalone device), the payload of a data stream can be inspected for keywords. Then, based on the keyword inspection, a blocking, masking or modifying (data stream transformation) mechanism can be employed to protect unauthorized or potentially harmful data from escaping the household/enterprise (i.e., intentional or accidental), irrespective of source-type and in a manner transparent to the destination.

One example of such a centralized point of control that performs the above-mentioned data stream inspection and transformation is described in the pending U.S. patent application identified as Ser. No. 13/247,423, entitled "Method and Apparatus for Friendly Man-in-the-Middle Data Stream Inspection," filed on Sep. 28, 2011, which is commonly assigned herewith and incorporated by reference herein. The centralized point of control described therein is a friendly man-in-the-middle (FMITM) device.

FIG. 1 is a block diagram illustrating an example embodiment of a system that performs the above-mentioned data stream analysis and transformation. As illustrated in FIG. 1, a network 190 includes a source device 105 that may transmit a data stream 107 intended for a destination (e.g., destination device 130). However, a friendly man-in-the-middle (FMITM) 100 receives (i.e., intercepts) the data stream 107 before the data stream escapes the network 190 toward the destination device 130. The device 100 is considered a "friendly" MITM device because the individuals who are the administrators (i.e., persons or parties who are managing and monitoring the data stream interception and transformation) are acting in the best interest of the users of the network. The network 190 could be, by way of example only, a home network or an enterprise network. As will be discussed in greater detail below, the FMITM 100 performs an analysis of context (e.g., attributes relating to the data stream including, but not limited to, user, group, identity, device, service, packet header, address, date, time and protocol) and content (e.g., payload) of one or more portions of the data stream 107. The FMITM 100 then forwards the portions of the data stream 107 out of the network 190 to the intended destination device 130 as a transformed data stream 118 according to the analysis.

Figure 2:
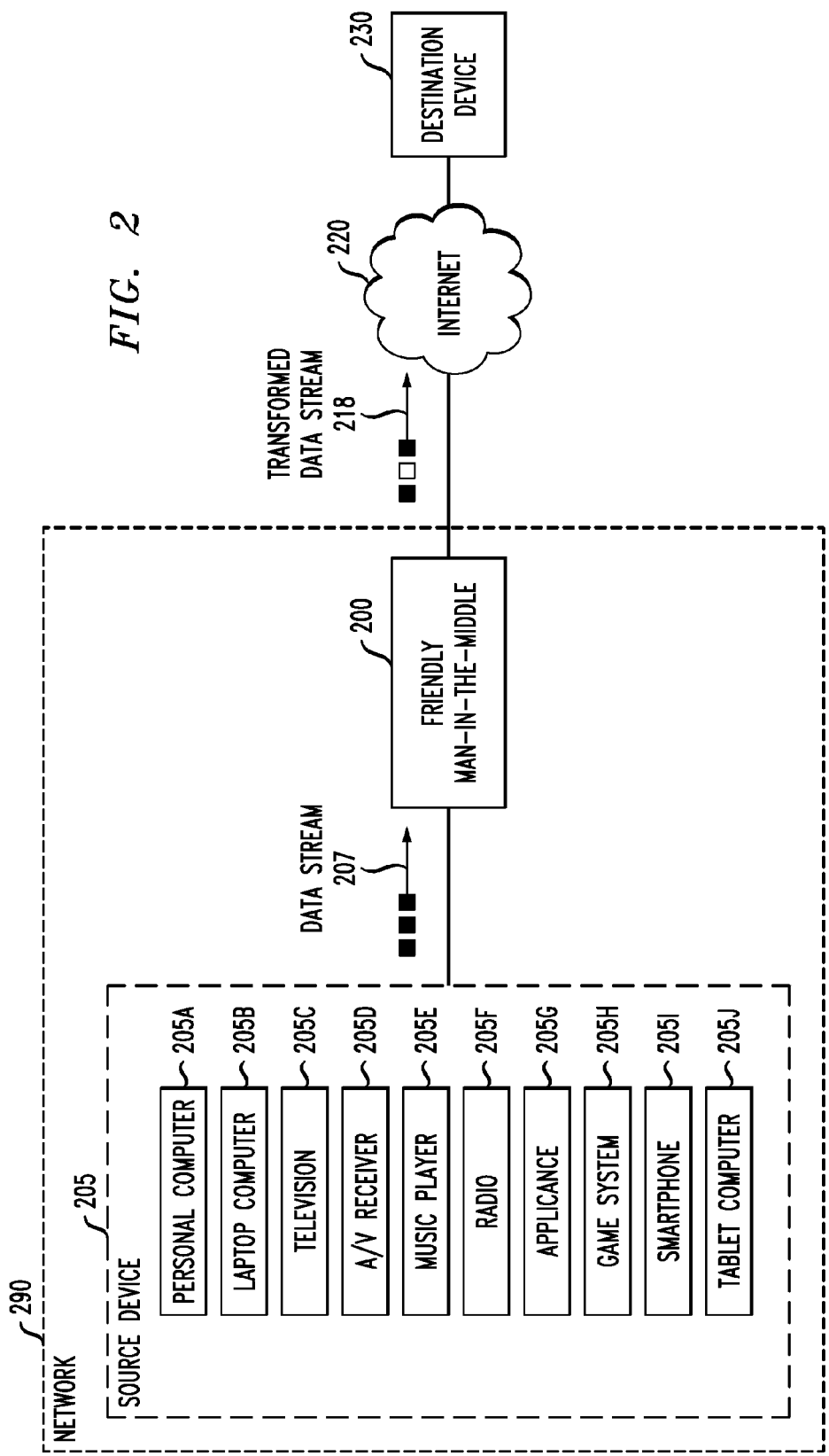
FIG. 2 shows a network environment with examples of a source device in accordance with one embodiment of the invention.

FIG. 2 is a block diagram further illustrating an example embodiment of a system that performs the above-mentioned data stream analysis and transformation. As illustrated in FIG. 2, a network 290 (e.g., home network or enterprise network) includes a source device 205 (e.g., personal computer 205A, laptop computer 205B, television 205C, A/V receiver 205D, music player 205E, radio 205F, appliance 205G, game system 205H, smartphone 205I, and tablet computer 205J) that may transmit a data stream 207 intended for a destination (e.g., destination device 230). However, a FMITM 200 receives (i.e., intercepts) the data stream 207 before the data stream escapes the network 290 toward the destination device 230 over the Internet 220. It should be understood that the FMITM 200 may intercept both wired (e.g., over Ethernet) and wireless (e.g., over WiFi) data streams 207 in the network 290.

Likewise, the FMITM 200 may include additional hardware, such as a picocell, from a cellular telephony carrier, to permit the FMITM 200 to intercept wireless communications (i.e., voice and data) from cellular telephones, tablet computers, and the like, connected to the cellular telephony carrier (e.g., over 3G or 4G connections). The FMITM 200 then forwards portions of the data stream 207 out of the network 290 to the intended destination device 230 as a transformed data stream 218 according to the analysis. In other embodiments, the FMITM 200 may include hardware to act as a repeater for the cellular telephony carrier so that it may intercept wireless communications and forward them back to the cellular telephony carrier's network (e.g., 3G or 4G network).

Further, unknown devices (not shown) found on the network 290 by the FMITM 200 may be constrained by a strict (i.e., default) policy until it is determined what the device is. For example, the FMITM 200 may monitor the context and the content of communications from the unknown device and, based on that monitored context and content information, determine the unknown device's type and apply a policy assigned to that device type. In other embodiments, the default policy may block all network communications for the unknown device. A notification may be sent to an administrator to determine, for example, the device type and user, and what policy should be applied to the device, thereby providing the administrator control over network access by unknown devices.

Advantageously, such a content-aware MITM approach as illustrated in FIGS. 1 and 2 provides for logging of social behavior that a particular network user is engaged in and data/content streams that they are sending over the private network and out onto the Internet (or an external user is communicating into the private network). The FMITM 100/

200 can then filter content that is deemed private by the administrator of the device, or based on one or more stored policies, such that the data stream that goes out of the network (stream 118/218) does not include such private content. One simple example is in the context of a home network wherein a parent is the administrator of the FMITM 100/200 and is monitoring data streams sent by his/her child from a computing device (source device 105/205). Perhaps the child does not realize that it is inappropriate to post a message on a social media website that indicates that the family is planning to be on vacation and away from home on some given dates in the future. The FMITM logs the data streams from the child's device and implements a policy to filter such information in such a way that the content is altered to maintain privacy, or that the content is blocked to certain destinations (e.g., non-family members) but available to other destinations (e.g., family members).

Thus, by providing an FMITM-based system that can analyze these data stream logs and compare new traffic patterns to what has previously been deemed acceptable allows an administrator to see new behavior as it emerges and make intelligent filtering decisions based on that knowledge.

However, it is further realized that source device users, within and outside of a private network, are constantly discovering new social media tools and communication methods. The movement to new tools and new methods may be a natural social evolution to newer more capable environments. Also, source device users, within and outside of a private network, may begin to perform unusually-sized data transfers or transfers during unusual hours, i.e., unusual communication patterns may occur.

For example, it is realized that a younger user may change from one application program (or protocol) such as Facebook™ to another application program such as Google+™ to get around any content-aware filtering or take advantage of new features. Also, device users may discover newer piracy software that can circumvent filtering using a new technique and begin performing this illegal activity at odd hours. Further, user communication that contains specific keywords (e.g., party, parents not home, "meet me") during certain time periods may go unnoticed and unanalyzed. Still further, the device user may change from one computing device to another computing device to continue a Facebook™ conversation to get around any filtering.

Thus, in accordance with one or more embodiments of the invention, the FMITM-based system is configured to access two or more data streams, e.g., that have been logged (stored). Alternatively, data streams can be accessed in real time, as they are received. The two or more data streams that are considered may be associated with two or more source devices, two or more application programs, or combinations thereof. The FMITM-based system then performs a time-based analysis on the two or more data streams. The time-based analysis determines whether or not a correlation exists between portions of the two or more data streams.

For example, the FMITM-based system analyzes multiple data streams that are associated with either multiple devices (e.g., a child's cell phone and laptop), multiple application programs (e.g., Facebook™ and Tumbler™), and/or some combinations thereof (e.g., the child accessing Facebook™ and then Tumbler™ via his/her cell phone, or the child accessing Facebook™ via his/her cell phone and then his/her laptop). The FMITM-based system then performs the time-based analysis to determine if there is any correlation between portions of these streams. Thus, the FMITM-based system correlates data streams that occur across different devices and/or different application programs in order to be able to detect and follow a related conversation, and filter and/or prevent privacy violations.

Further, the FMITM-based system can begin determining and presenting to the administrator context-aware, traffic patterns. These new types of traffic patterns can be kept for long periods of time. As the traffic for the previous 24 hours is analyzed, it can be compared against context-aware patterns from previous weeks and months. Using the correlation techniques described herein, new context can be applied to historical data to find previously-missed privacy violations.

Thus, as new privacy violations are uncovered (e.g., a file transfer protocol (FTP) being used to download Trojans), an administrator can perform a historical analysis of how often this has occurred before. Also, this type of interface can look at a new data stream and query the FMITM-based system whether or not it has been seen before. The FMITM-based system accomplishes this by correlating context and/or content of data streams across multiple endpoints (e.g., source devices), protocols (e.g., application programs), or combinations thereof (e.g., looks for the same or similar context and/or content across these multiple data streams).

By way of further example, the data stream correlation techniques of the FMITM-based system can employ a combination of disabling traffic by choice or detecting malware more easily. That is, in one example, the system can detect similar "party" phrases across Yahoo™, Google+™ and Twitter™, as well as several chat clients. Further, the system can detect large data transfers at an odd hour, e.g., an otherwise trusted user normally performs large data transfers during daytime hours, but in one or more instances, performed such a transfer during the overnight hours. The FMITM-based system can provide a report which points out anomalies (e.g., an increase in the use of the word "party" or an increase in the number of transactions after midnight) that allows an administrator to investigate and possibly flag and/or disallow that type of behavior for that content and that user.

Figure 3:
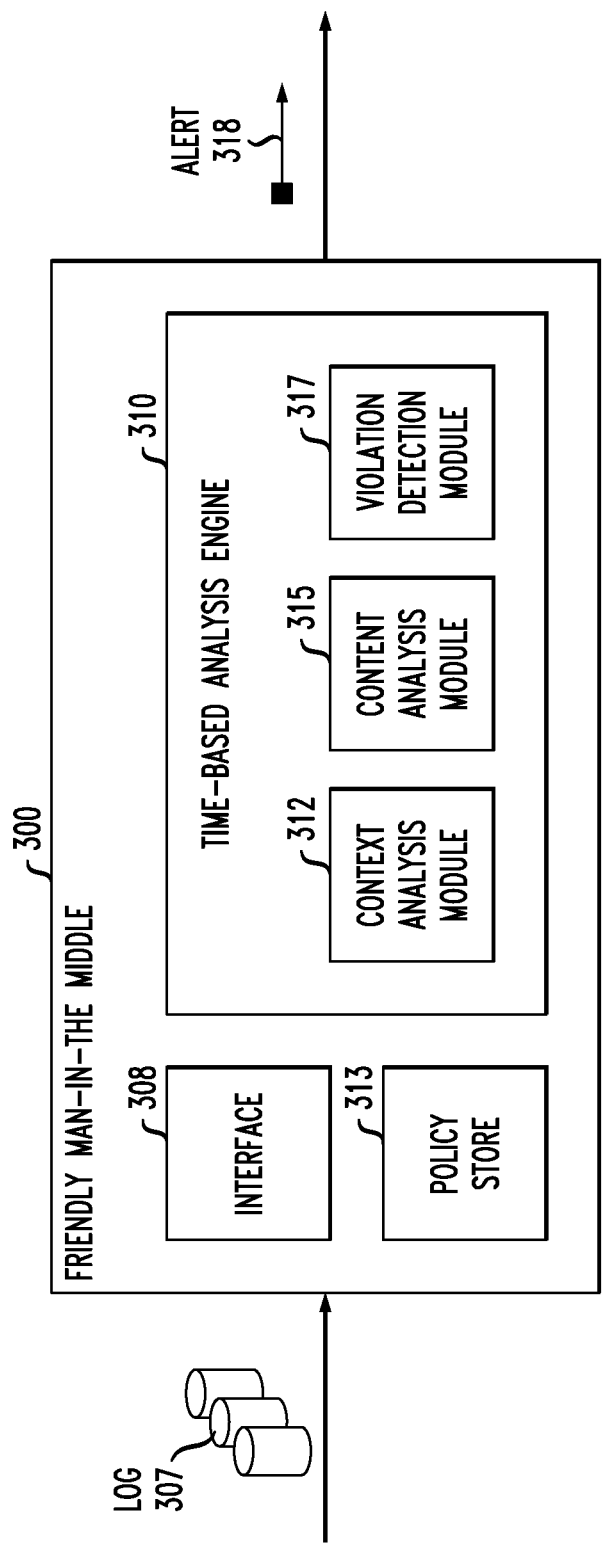
FIG. 3 shows a friendly man-in-the-middle device in accordance with one embodiment of the invention.

FIG. 3 illustrates a FMITM-based system for performing the time-based analysis according to one embodiment of the invention. The time-based analysis can be performed on a log 307 of stored data streams. Log 307 may include log entries for both incoming and outgoing data communications. In a one embodiment, log 307 is generated and maintained by a FMITM 300.

As illustrated in FIG. 3, the FMITM 300 includes an interface 308 configured to access log 307 for data streams. A time-based analysis engine 310 performs an analysis on context and content of data stream entries from log 307. The engine 310 then determines if the result of the analysis results in a violation of a policy stored in a policy store 313. An alert can be presented or an action can be initiated when a violation is determined.

Time-based analysis engine 310 includes a context analysis module 312 that analyzes the context of the data stream entries from log 307. The analysis module 312 inspects attributes relating to the data stream entries including, but not limited to, user, group, identity, device, service, packet header, address, date, time and protocol, and determines whether there is any correlation (e.g., match) between respective data streams for one or more of the attributes that are considered. Thus, for example, if it is the same user that is generating data streams for multiple different devices and/or multiple different protocols, this will become known to the FMITM device.

Further, engine 310 includes a content analysis module 315 that analyzes the content of the data stream entries. The analysis module 315 determines whether there is any correlation (e.g., match) between content of data streams that are considered. This may be done by parsing the content of each stream and comparing the parsed content across streams to look for matches and/or similarities in content (e.g., keywords). Thus, for example, once the FMITM knows that the same user is generating data streams for multiple different devices and/or multiple different protocols, the content of these data streams is analyzed to determine if the communication associated with any two data streams is related.

Still further, engine 310 includes a violation module 317 that determines whether results of the context analysis 312 and/or the content analysis 315 are indicative of a violation of a policy from policy store 313. If a violation is determined, FMITM 300 can output an alert 318 to the administrator. This may include a time-sequenced representation (e.g., one or more correlated timelines) indicating correlated portions of two or more data streams that have been analyzed (examples of which will be described below in the context of FIGS. 6-8). Also, FMITM 300 can perform an action such as a transformation (blocking/modifying) of a portion or all of a given data stream, as mentioned above with regard to the systems of FIGS. 1 and 2.

Figure 4:
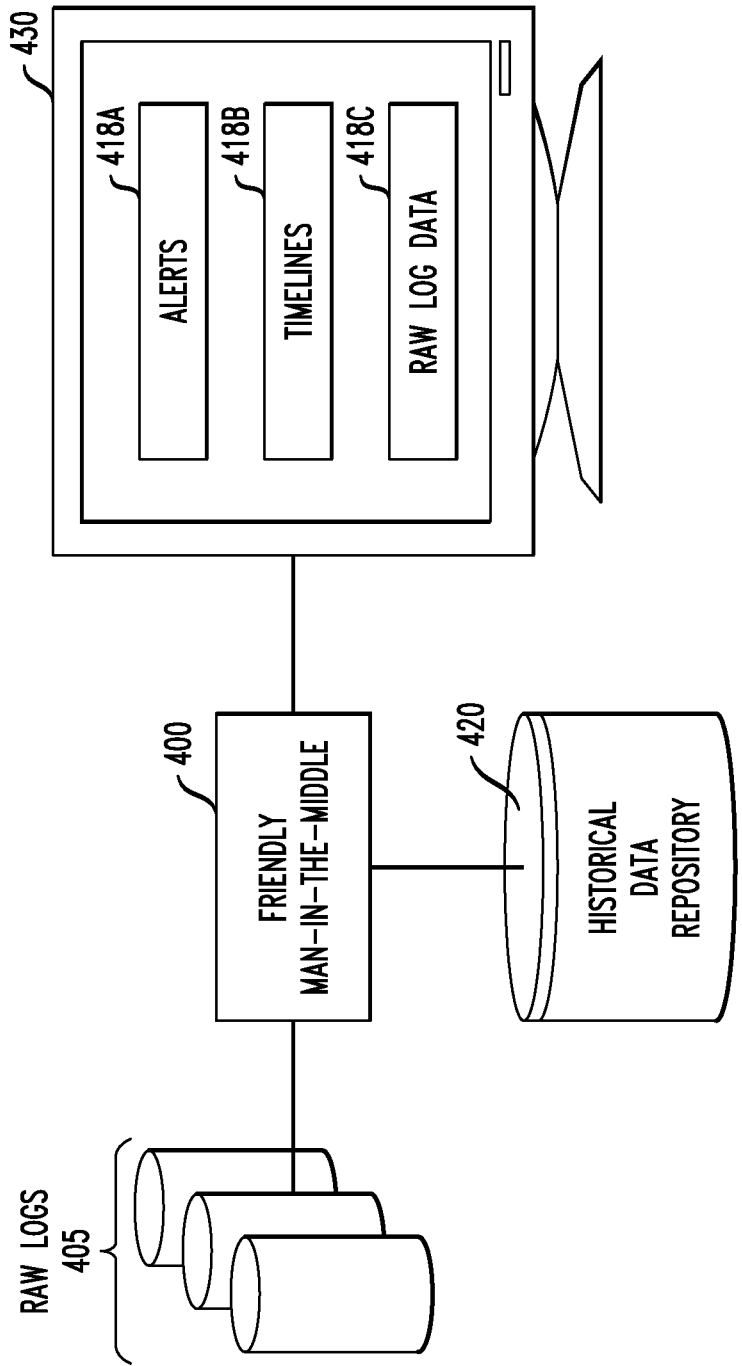
FIG. 4 shows a network environment with a friendly man-in-the-middle device in accordance with another embodiment of the invention.

FIG. 4 illustrates an FMITM-based system according to another embodiment of the invention. System 400 can have the same or similar functionalities as system 300. Thus, as illustrated in FIG. 4, raw logs 405 may be accessed by a FMITM 400 for analysis. Raw logs 405 may include router logs, application logs and any other log showing records of prior data transactions and events. The FMITM 400 then may perform the context and content analysis described above (e.g., for the system in FIG. 3).

For example, the FMITM 400 may parse entries in the raw logs 405 for display (on monitor 430), with a policy defining log entries containing a potential privacy issue as alerts 418A displayed in red, bold or in another manner of highlighting. Similarly, log entries not containing a potential privacy issue (i.e., private to a user but with no cause for alarm) may be displayed on monitor 430 as raw log data 418C in white, or hidden altogether, according to the policy. Thus, the FMITM 400 is able to draw the attention of an administrator (not shown) to log entries containing a potential privacy issue 418A without overly invading the privacy of the source device user (not shown) by limiting the number of alerts 418A to only those log entries containing a potential privacy issue and not those log entries containing harmless information private to the user.

Further, the FMITM 400 may generate one or more timelines 418B and display them on monitor 430 showing correlations between data streams, or portions thereof, that were sent perhaps via multiple devices, multiple protocols, or combinations thereof. Examples of these timelines will be described below in the context of FIGS. 6-8.

The FMITM 400 also may maintain a historical data repository 420 to store log data, either as raw logs 405 or parsed data. A time-based analysis engine of the FMITM (not shown) (e.g., engine 310 of FIG. 3) may compare the context and content of entries in the raw logs 405 against the historical data repository 420 to detect unexpected values in the data streams. For example, the historical data repository 420 may indicate a device is active during normal business hours. If the analysis engine analyzes communications sent just after midnight, an alert may be provided because the context of those communications (i.e., time of day) is atypical to what is recorded in the historical data repository 420. Thus, the FMITM 400 may provide an alert 418A indicative of the unexpected value in the context of the data stream. Similar analysis and alerts may be provided based on results of content analysis. In this manner, patterns may be determined, and a frequency of past occurrence of such pattern(s) may be learned.

Although system elements in FIGS. 1-4 are shown as separate elements, these elements or portions thereof may be implemented at least in part on a common processing platform. In other embodiments, one or more of the system elements may each be implemented on a separate processing platform, such as the processing platform to be described below in conjunction with FIG. 5. By way of example only, the FMITM device (100, 200, 300 or 400) may be implemented on a first processing device of a first processing platform and logs (307, 405) and/or a historical data repository (420) may be implemented on a second processing device of a second processing platform. The other system elements may be implemented on one or the other of these processing devices/platforms, or on one or more other processing devices/platforms. It is also to be understood that a given embodiment of the FMITM-based system may include multiple instances of the elements shown in FIGS. 1-4, although only single instances of such elements are shown in the system diagrams for clarity and simplicity of illustration.

Figure 5:
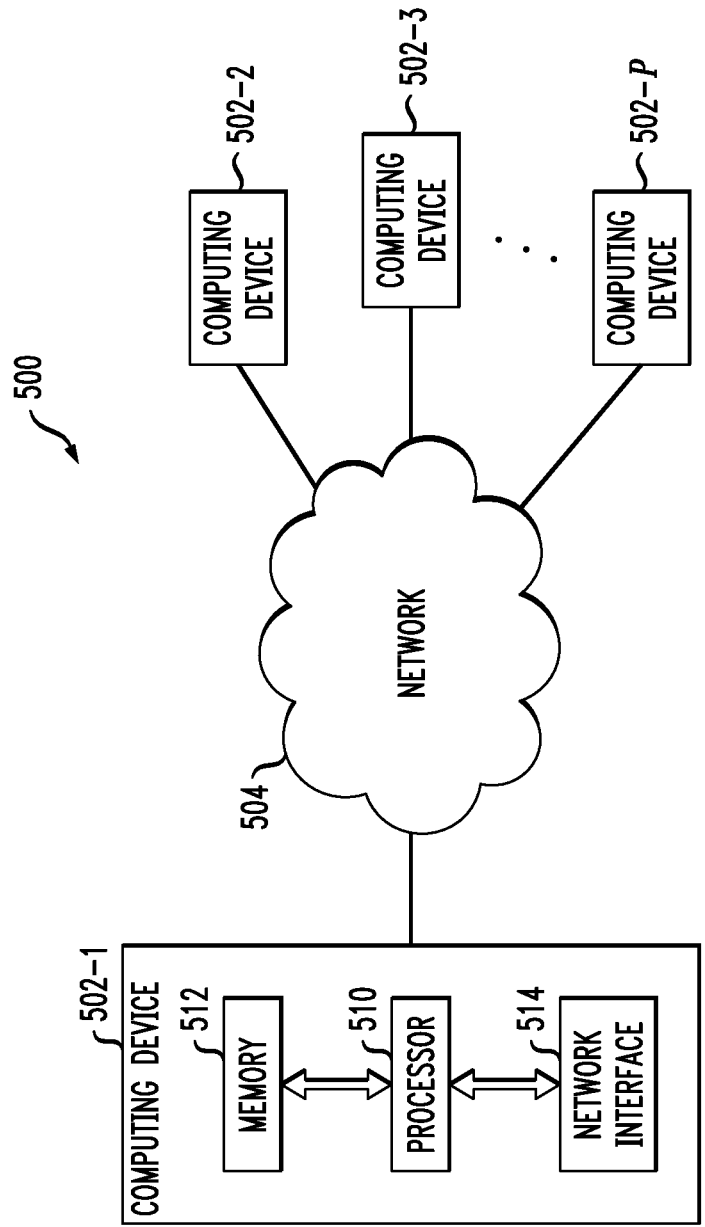
FIG. 5 shows a distributed computing platform in accordance with one embodiment of the invention.

An example of a processing platform on which the FMITM-based system may be implemented is information processing platform 500 shown in FIG. 5. The processing platform 500 in this embodiment comprises at least a portion of the FMITM-based system and includes a plurality of computing devices, denoted 502-1, 502-2, 502-3, . . . 502-P, which communicate with one another over a network 504. One or more of the elements of the FMITM-based system may therefore each run on a computing device, computer or other processing platform element, which may be viewed as an example of what is more generally referred to herein as a "processing device." As illustrated in FIG. 5, such a device generally comprises at least one processor and an associated memory, and implements one or more functional modules for controlling certain features of the FMITM-based system. Again, multiple elements or modules may be implemented by a single processing device in a given embodiment.

The computing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. The memory 512 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the computing device 502-1 causes the device to perform functions associated with one or more of the elements of the FMITM-based system. One skilled in the art would be readily able to implement such software given the teachings provided herein. Other examples of computer program products embodying embodiments of the invention may include, for example, optical or magnetic disks.

Also included in the computing device 502-1 is network interface circuitry 514, which is used to interface the server with the network 504 and other system components. Such circuitry may comprise conventional transceivers of a type well known in the art.

The other computing devices 502 of the processing platform 500 are assumed to be configured in a manner similar to that shown for computing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in the figure is presented by way of example only, and the FMITM-based system may include additional or alternative processing platforms, as well as numerous distinct processing platforms in any combination.

Also, numerous other arrangements of computing devices, servers, computers, storage devices or other components are possible in system 500. Such components can communicate with other elements of the system 500 over any type of network, such as a wide area network (WAN), a local area network (LAN), a satellite network, a telephone or cable network, or various portions or combinations of these and other types of networks.

Figure 6:
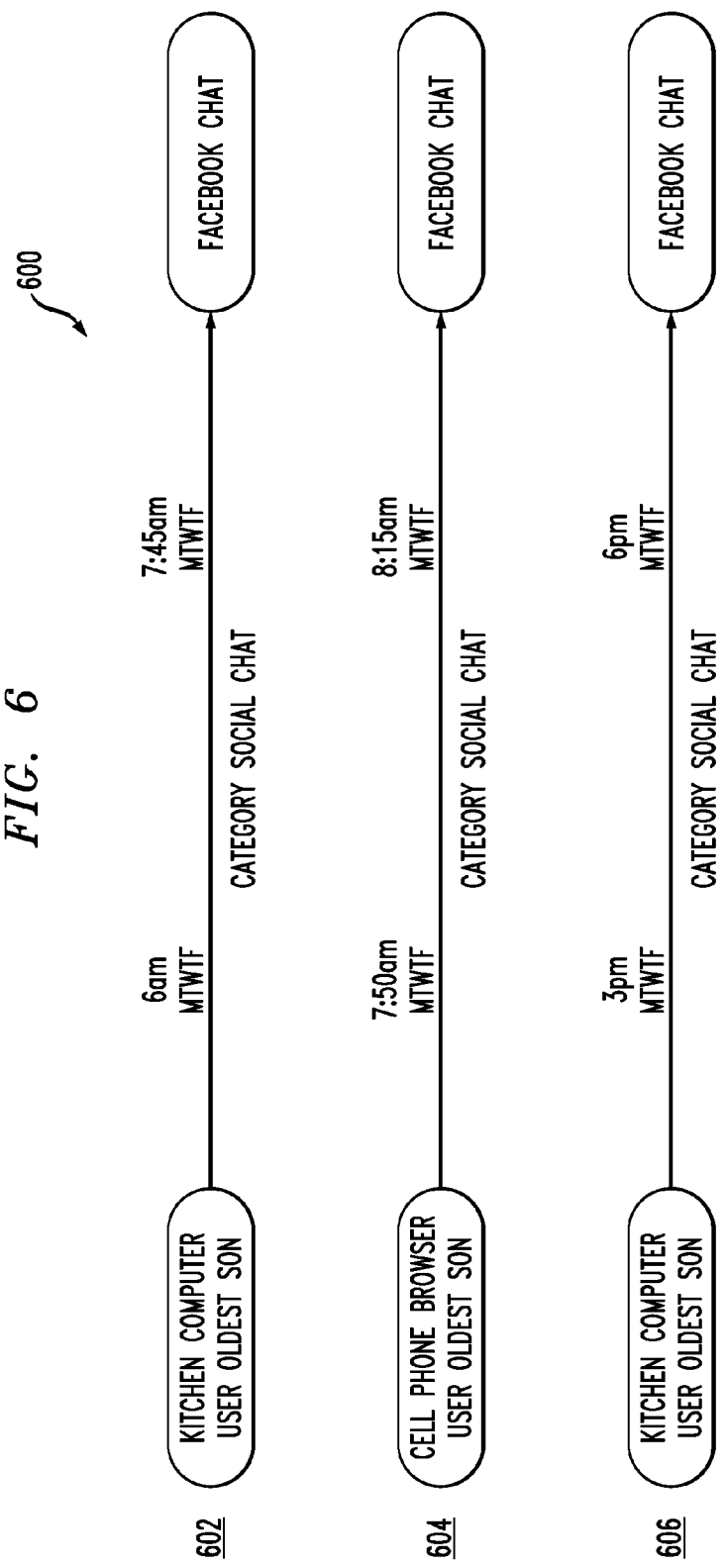
FIGS. 6-8 show examples of timelines in accordance with embodiments of the invention.
Figure 7:
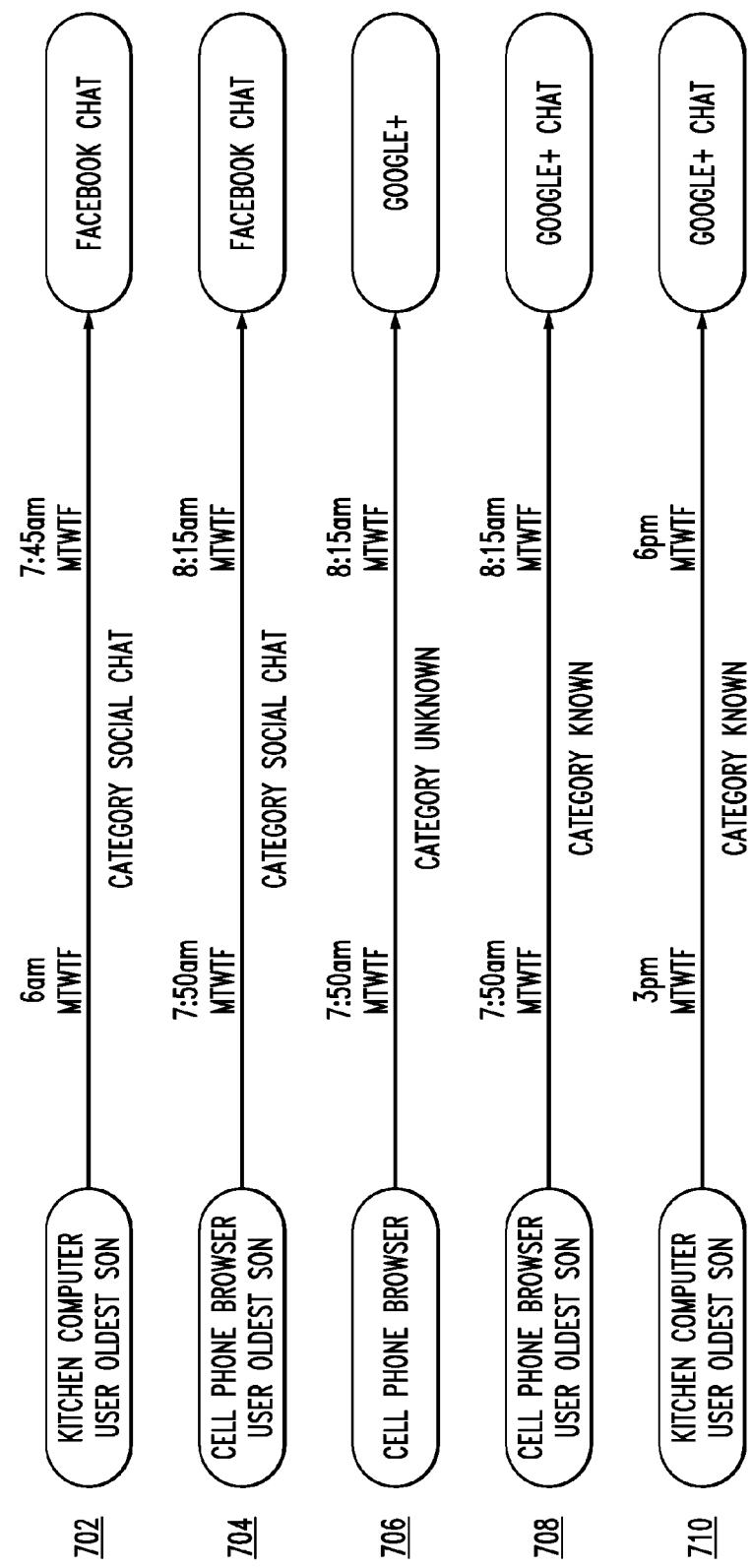
Figure 8:
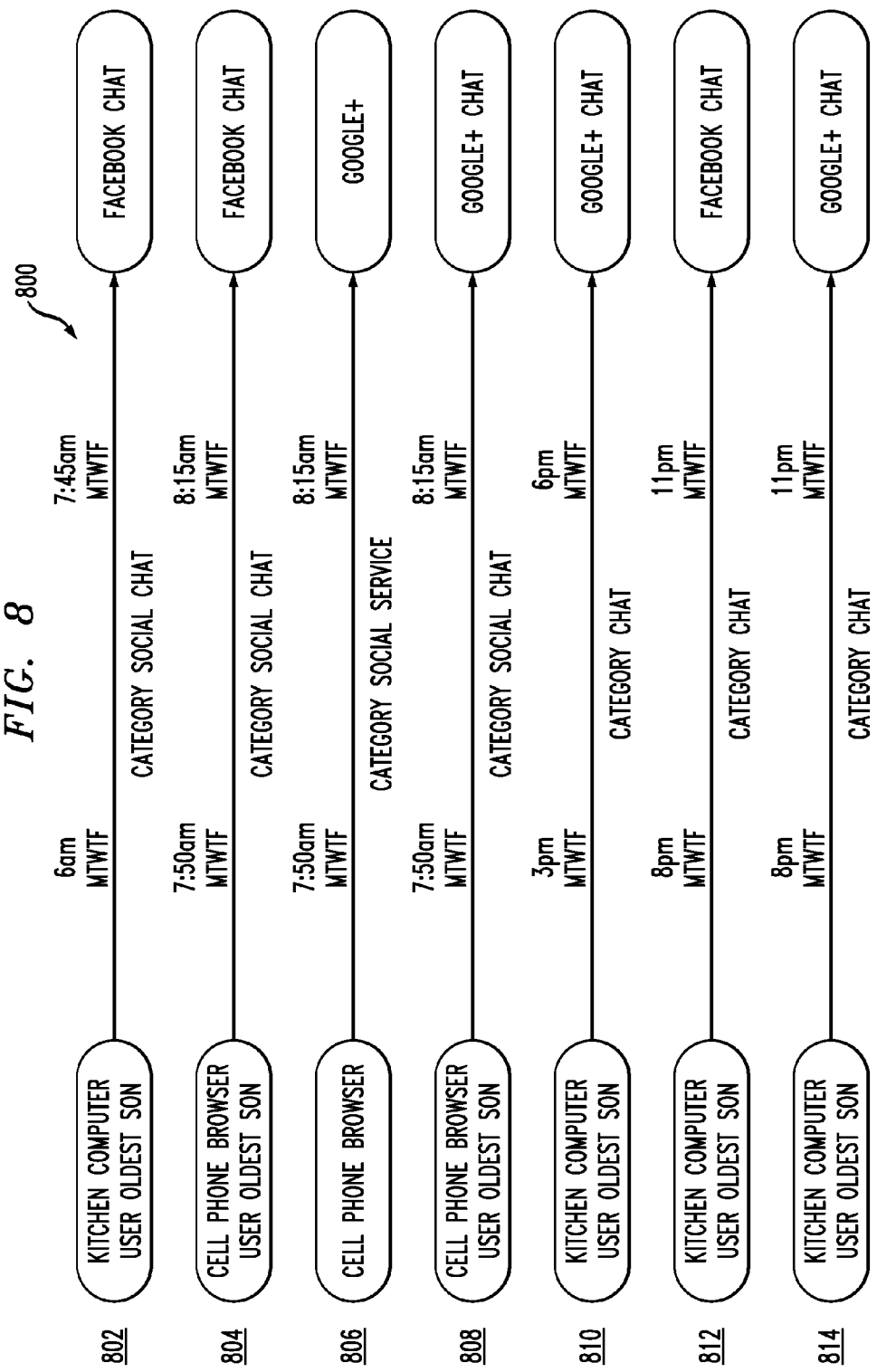

FIGS. 6-8 show examples of timelines generated by an FMITM-based system in accordance with embodiments of the invention. For example, such timelines can be generated by each of the FMITM devices described in FIGS. 1-4, and presented on a display such as monitor 430 in FIG. 4.

The set of timelines 600 in FIG. 6 (including 602 through 606) illustrate to the administrator what is considered a normal pattern. For example, after correlation of multiple data streams in accordance with time-based analysis techniques described herein, the FMITM device shows a timeline 602 for data streams associated with a social chat that the administrator's oldest son had on Facebook™ using a kitchen computer Monday through Friday between 6 am and 7:45 am. Timelines 604 and 606 show other normal communication patterns exhibited by this son. That is, the son appears to typically switch over to his cell phone at 7:50 am to chat on Facebook™. He then typically chats on Facebook™ from 3 pm to 6 pm. Note that, in these examples, the son is generating multiple data streams over a single application program (protocol) using multiple devices. The parent (administrator) can thus now see the correlation between these data streams as a result of the time-based analysis performed by the FMITM device.

Next, the set of timelines 700 in FIG. 7 (including 702 through 710) illustrate new patterns to the administrator. Notice that while timelines 702 and 704 correspond to 602 and 604 in FIG. 6, timelines 706, 708 and 710 represent one or more new patterns. That is, note that in 706, an unknown user communicated over Google+™ on a cell phone. This could be the oldest son, but it is unknown at this time. It is also unknown what the data stream category is for this stream, as well as for 708 and 710. However, it is assumed that the corresponding data streams were flagged as being correlated in some way with the other data streams represented by the timelines shown. Therefore, these timelines are included in the set of timelines 700. Note also that, in 708 and 710, the oldest son moves from Facebook™ to Google+™ Chat and presumably continues a conversation he started on Facebook™ With the portions of these multiple data streams being correlated and presented to the administrator, the administrator can make decisions as to what should be done about this new pattern.

The set of timelines 800 in FIG. 8 (including 802 through 814) further illustrate new patterns to the administrator. Note that timelines 802 and 804 correspond to timelines 702 and 704 of FIG. 7. Timeline 806, 808 and 810 correspond to 706, 708 and 710 in FIG. 7, with the exception that the categories of the respective data streams are now known (i.e., social service, social chat, chat). New patterns are illustrated in timelines 812 and 814.

Thus, with the FMITM performing a time-based analysis, the system looks at all traffic not just specific targets. Also, the system detects changes in regard to timeline norms. The system allows the administrator to manually change a category from unknown to a known category (e.g., chat, social chat, social service). The system can automatically change a category as well. The system also groups data streams into timelines to give the administrator full continuity to the information flow across multiple devices and/or multiple application programs.

Furthermore, it is to be appreciated that the FMITM device using the time-based analysis, as described herein, has the ability to track all payloads and endpoints over time in the network(s) that it is monitoring, and through its correlation techniques, determine intended and unintended content flow. Thus, the FMITM device can detect a deceptive application such as a spoofing program or protocol that is attempting to hide a conversation or transaction.

Figure 9:
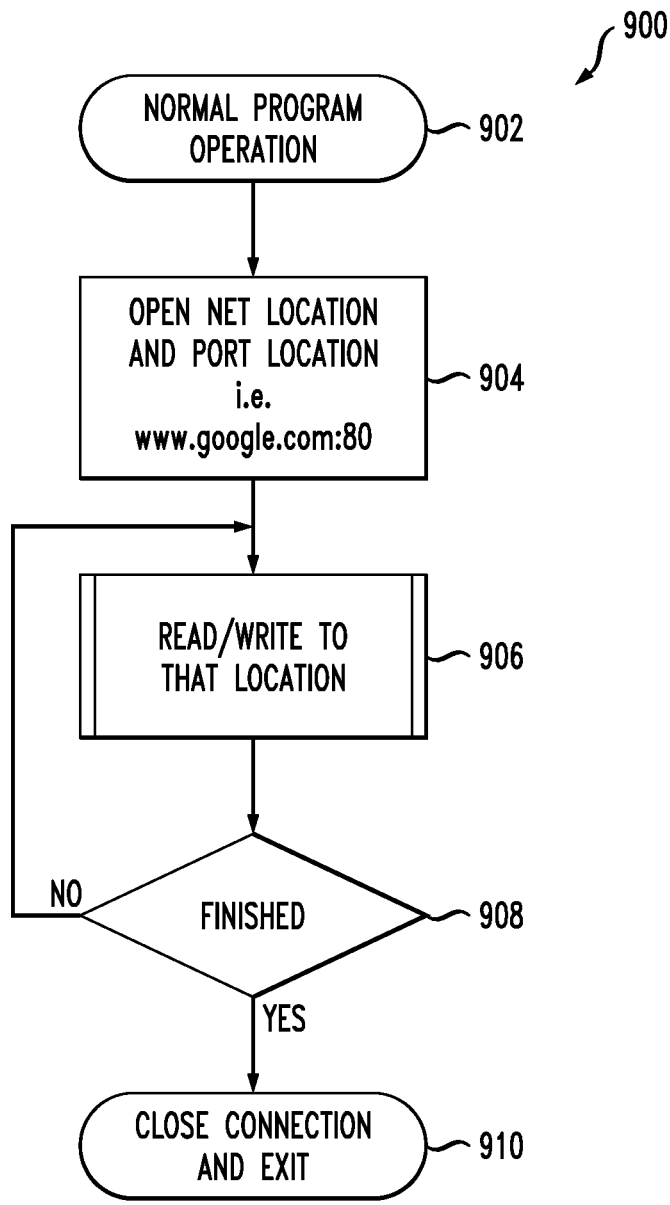
FIG. 9 shows a normal program operation in accordance with one embodiment of the invention.

FIG. 9 shows a normal program operation 900. By way of example, the program may be executed on a source device 105/205 (in FIGS. 1 and 2) and result in the generation of one or more data streams relating to a conversation or a transaction.

As shown, program operation begins at block 902. In step 904, an Internet location and a port location are opened by the program. This may be a single or a set of specific address/port ranges. In step 906, data is read/written by the program to these locations. If read/write operations are completed (step 908), then the connection is closed by the program at block 910. If not, then the program returns to step 906, and that step and subsequent ones are repeated by the program.

Figure 10:
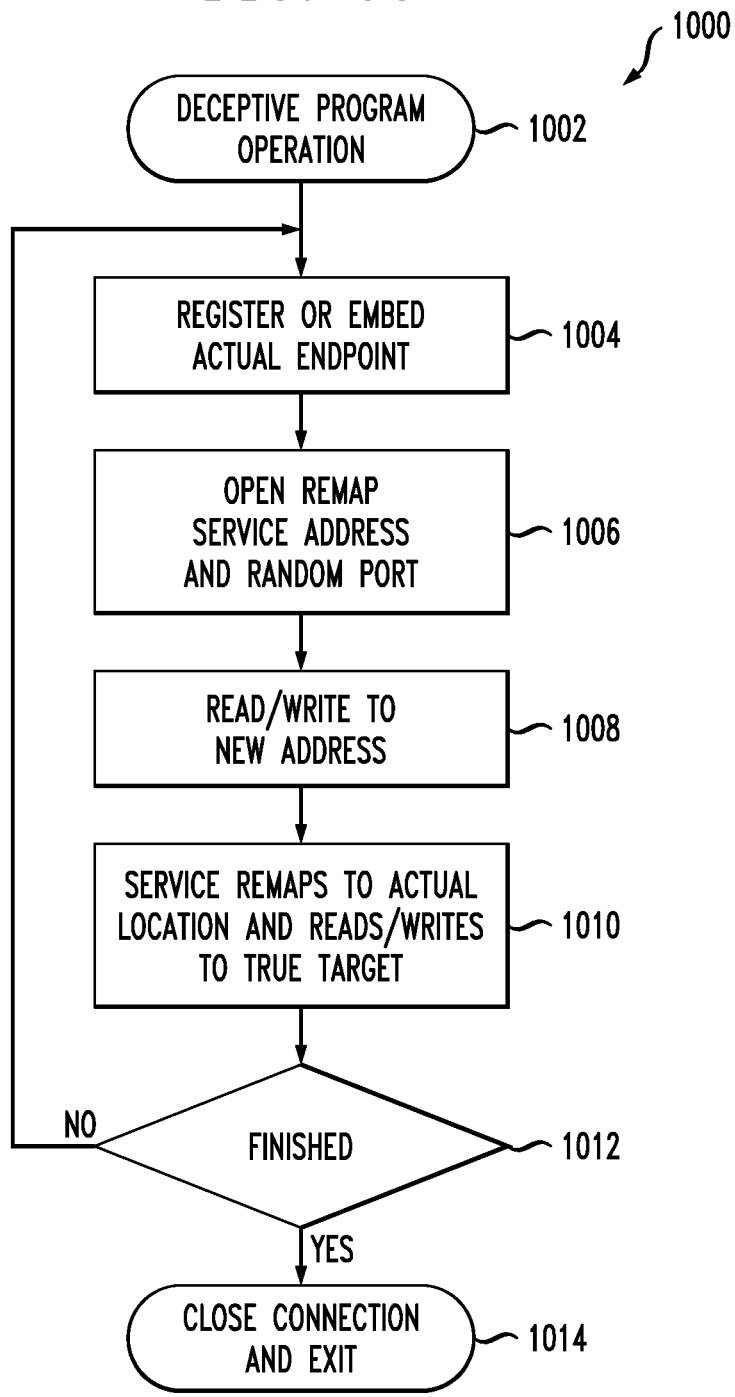
FIG. 10 shows a deceptive program operation in accordance with one embodiment of the invention.

FIG. 10 shows a deceptive program operation 1000. As shown, program operation begins at block 1002. In step 1004, the program registers or embeds in an endpoint (e.g., source device 105/205). In step 1006, the program opens a remap service for a new address and a random port. In step 1008, the program reads/writes to the new (secret or hidden) address. In step 1010, the service remaps to the actual (intended) location and reads/writes to the true target. If finished (step 1012), the connection is closed by the program at block 1014. If not, then the program returns to step 1004, and that step and subsequent ones are repeated by the program. Thus, the deceptive program intercepts a data stream from a legitimate program, sends the data stream to a new address it secretly opened, and then sends the data stream to the true destination (intended by the legitimate program).

Without the time-based analysis and correlation techniques described herein, the hidden data stream sent to the secret destination by the deceptive program in FIG. 10 would likely go unnoticed. However, with such techniques described herein, the FMITM device is able to correlate the data streams (i.e., secret stream and intended stream) sent by the deceptive program and alert the administrator or some other system to take action about this deceptive program (e.g., remove it from the source device).

Figure 11:
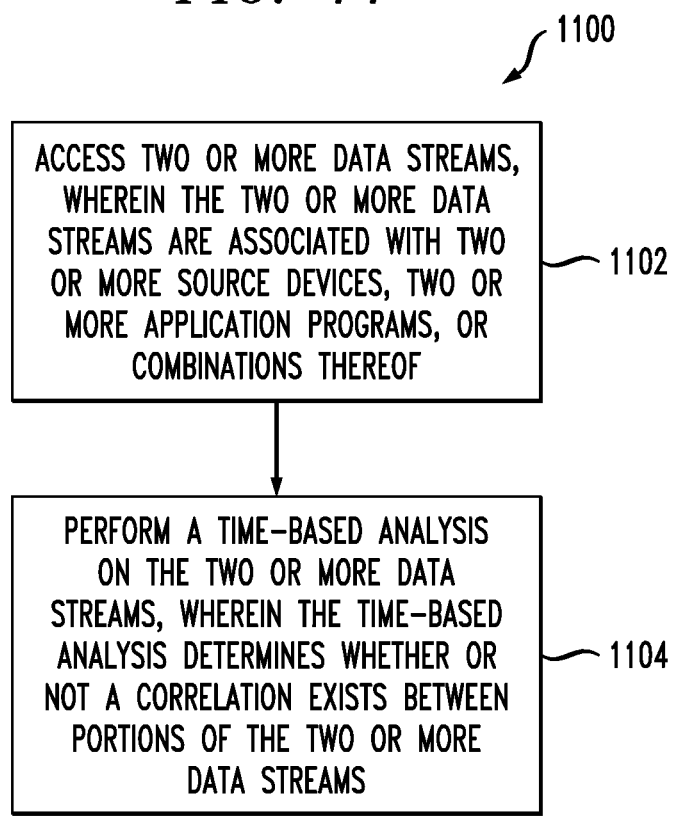
FIG. 11 shows a time-based analysis methodology in accordance with one embodiment of the invention.

Lastly, FIG. 11 shows a time-based analysis methodology 1100 in accordance with one embodiment of the invention. The methodology 1100 may be performed by a FMITM device (e.g., 100, 200, 300 or 400, as shown in the previous figures).

As shown, in step 1102, two or more data streams are accessed. The two or more data streams can be associated with two or more source devices, two or more application programs, or combinations thereof.

In step 1104, a time-based analysis is performed on the two or more data streams. The time-based analysis determines whether or not a correlation exists between portions of the two or more data streams.

Accordingly, the FMITM device can track network data streams in time so it can piece together conversations regardless of endpoint port combination. Further, the FMITM data streams can be categorized and redisplayed in proper time sequence as well as displayed in content appropriate manners. Still further, the FMITM time-based analysis can select the appropriate meta information to give context to a communication sequence example: actual address/port information.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
    identifying two or more data streams, wherein the two or more data streams are respectively associated with at least two of one or more source devices and one or more application programs associated with at least one network and attributable to at least one common user, wherein at least one of the identified two or more data streams is obtained from a historical data repository in which the data stream is logged;
    performing a time-based analysis on the two or more data streams, wherein the time-based analysis determines whether or not a correlation, based on an evaluation of content and context, exists between portions of the two or more data streams such that a determination is made as to whether or not the two or more data streams correspond to related content and whether or not correlated portions of the two or more data streams comprise a pattern having a given frequency of occurrence; and
    determining whether or not correlated portions of the two or more data streams are indicative of a violation of a policy applicable to the network, so as to modify at least one of the two or more data streams, before the data stream enters or leaves the network, when a violation is indicated, wherein modifying at least one of the two or more data streams comprises at least one of altering, masking and blocking at least a portion of data in the data stream being modified;
    wherein the steps are performed by at least one processing device comprising a processor coupled to a memory.

2. The method of claim 1, further comprising the step of generating at least one time-sequenced representation from the time-based analysis, wherein the time-sequenced representation indicates correlated portions of the two or more data streams.

3. The method of claim 2, wherein the time-sequenced representation comprises a timeline.

4. The method of claim 1, further comprising the step of generating an alert when a violation of the policy is determined.

5. The method of claim 4, further comprising the step of presenting the alert to an administrator.

6. The method of claim 1, further comprising the step of automatically initiating an action when a violation of the policy is determined.

7. The method of claim 1, further comprising the step of determining whether or not another data stream logged in the historical data repository is also correlated with the two or more data streams.

8. The method of claim 1, further comprising the step of determining whether or not a current data stream is also correlated with the two or more data streams.

9. The method of claim 1, further comprising the step of taking action with respect to at least a portion of the two or more data streams or at least one subsequent data stream, prior to the portion of the two or more data streams or the subsequent data stream leaving or entering the network, when a violation of the policy is indicated.

10. A computer program product comprising a non-transitory processor-readable storage medium having encoded therein executable code of one or more software programs, wherein the one or more software programs when executed by the processor of the processing device implement the steps of:
    identifying two or more data streams, wherein the two or more data streams are respectively associated with at least two of one or more source devices and one or more application programs associated with at least one network and attributable to at least one common user, wherein at least one of the identified two or more data streams is obtained from a historical data repository in which the data stream is logged;
    performing a time-based analysis on the two or more data streams, wherein the time-based analysis determines whether or not a correlation, based on an evaluation of content and context, exists between portions of the two or more data streams such that a determination is made as to whether or not the two or more data streams correspond to related content and whether or not correlated portions of the two or more data streams comprise a pattern having a given frequency of occurrence; and
    determining whether or not correlated portions of the two or more data streams are indicative of a violation of a policy applicable to the network, so as to modify at least one of the two or more data streams, before the data stream enters or leaves the network, when a violation is indicated, wherein modifying at least one of the two or more data streams comprises at least one of altering, masking and blocking at least a portion of data in the data stream being modified.

11. The computer program product of claim 10, further comprising the step of generating at least one time-sequenced representation from the time-based analysis, wherein the time-sequenced representation indicates correlated portions of the two or more data streams.

12. The computer program product of claim 11, wherein the time-sequenced representation comprises a timeline.

13. The computer program product of claim 10, further comprising the step of generating an alert when a violation of the policy is determined.

14. The computer program product of claim 13, further comprising the step of presenting the alert to an administrator.

15. The computer program product of claim 10, further comprising the step of automatically initiating an action when a violation of the policy is determined.

16. An apparatus comprising:
    a memory; and a hardware processor operatively coupled to the memory and configured to:

identify two or more data streams,
wherein the two or more data streams are respectively associated with at least two of one or more source devices and one or more application programs associated with at least one network and attributable to at least one common user,
wherein at least one of the identified two or more data streams is obtained from a historical data repository in which the data stream is logged;

perform a time-based analysis on the two or more data streams,
wherein the time-based analysis determines whether or not a correlation, based on an evaluation of content and context, exists between portions of the two or more data streams such that a determination is made as to whether or not the two or more data streams correspond to related content and whether or not correlated portions of the two or more data streams comprise a pattern having a given frequency of occurrence; and determine whether or not correlated portions of the two or more data streams are indicative of a violation of a policy applicable to the network, so as to modify at least one of the two or more data streams, before the data stream enters or leaves the network,
when a violation is indicated, wherein modifying at least one of the two or more data streams comprises at least one of altering, masking and blocking at least a portion of data in the data stream being modified.

17. The apparatus of claim 16, wherein the processor is further configured to generate at least one time-sequenced representation from the time-based analysis, wherein the time-sequenced representation indicates correlated portions of the two or more data streams.

18. The apparatus of claim 16, wherein the processor is further configured to determine whether or not another data stream logged in the historical data repository is also correlated with the two or more data streams.

19. The apparatus of claim 16, wherein the processor is further configured to determine whether or not a current data stream is also correlated with the two or more data streams.

20. The apparatus of claim 16, wherein the processor is further configured to take action with respect to at least a portion of the two or more data streams or at least one subsequent data stream, prior to the portion of the two or more data streams or the subsequent data stream leaving or entering the network, when a violation of the policy is indicated.

* * * * *